Nov. 20, 1951  R. D. MALM  2,575,965
RIGID JOINT BETWEEN TUBULAR STRUCTURES
Filed July 30, 1945
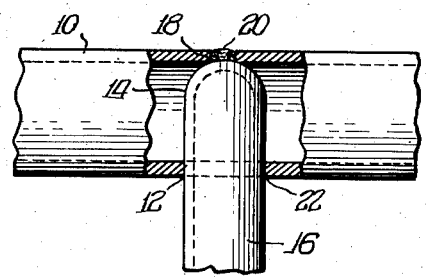
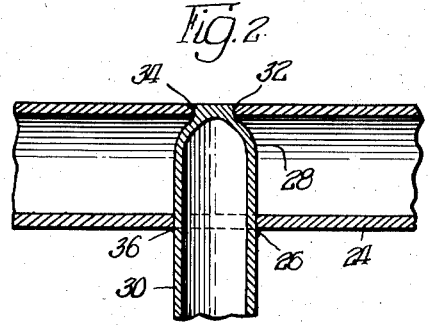
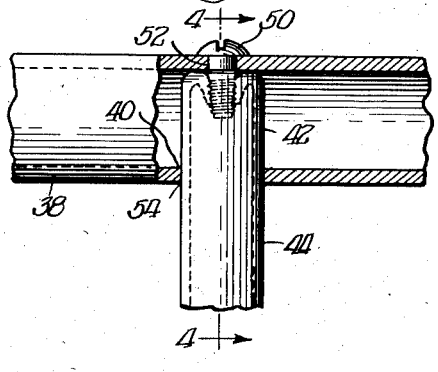
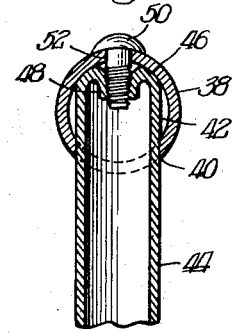
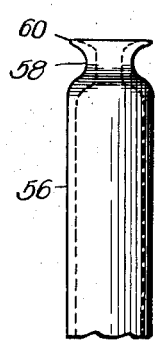
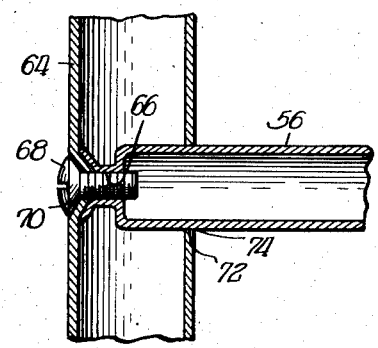
INVENTOR.
Royal D. Malm,
BY Patented Nov. 20, 1951

2,575,965

UNITED STATES PATENT OFFICE 2,575,965

RIGID JOINT BETWEEN TUBULAR STRUCTURES

Royal D. Malm, Evanston, Ill., assignor to Clayton Mark & Company, Evanston, Ill., a corporation of Delaware Application July 30, 1945, Serial No. 607,764

7 Claims. (Cl. 287—54)

This invention pertains to tubular structures and the method of joining said structures.

There are many structures in which tubular members are joined together such as furniture, stands, display racks, mechanical devices, etc., and heretofore in most instances the tubular members are joined by means of a surface weld. One common way of forming a joint between tubular members is to mill the end of one member to fit the contour of the other member, and to weld the joint by arc or gas welding. This type of joint is objectionable because, under stress, all the strain comes on one wall of the tubing, it takes a high degree of skill to make such a joint, it is slow, and there may be an imperfection in the welded joint. Frequently it is sought to strengthen such a joint as by using a flange connection, but this requires more work and expense, introduces a third piece and does not look neat.

It is, therefore, an object of this invention to provide a strong and neat connection, particularly for tubular members, which requires a minimum of work to effect and can be done by unskilled labor.

Another object of the invention is to provide a joint for tubular or other parts which is easily assembled and as easily dissembled for shipment or storage.

Another object of the invention is to provide means for connecting structures such as tubular structures, and the method of connecting such structures whereby the parts may be plated and polished before assembling.

Another object of the invention is to provide a connection for tubular structures, such as a structural tube and spreader, which may be permanent or demountable and so arranged as to prevent bending action on the structural tube when the spreader is secured thereto.

Another object of the invention is to provide a connection for tubular structures wherein the joint can be fabricated with unskilled labor and wherein the fastening means is primarily in tension.

Another object of the invention is to provide a connection for tubular members wherein one of the members will not have a tendency to rotate after assembly, which would loosen or tend to loosen the fastening means.

Another object of the invention is to provide tubular members which are self-locking so that in use rotation is prevented.

Another object of the invention is to provide a connection for tubular joints which is positive, strong and neat in appearance, and one which can be made with less work and skill than the ordinary tubular joints.

Another object of the invention is to provide connecting means for tubular joints which may be removable or may be electrically fused or spot welded, one within the other.

Another object of this invention is, in the welded type of joint, to move the weld out of the zone of maximum stress concentration, thereby increasing the efficiency of the welded joint and eliminating tendency toward fatigue failure.

With these and various other objects in view, the invention may consist of certain novel features of construction and operation as will be more fully described and particularly pointed out in the specification, drawings and claims appended hereto.

In the drawings, which illustrate embodiments of the invention and wherein like reference characters are used to designate like parts—

Figure 1 is a fragmentary elevation, partly in section, of one form of joint between tubular members, embodying the invention;

Figure 2 is a fragmentary sectional elevation through a modified form of permanent connection between tubular members;

Figure 3 is a fragmentary elevation, partly in section, of a form of temporary connection between tubular members;

Figure 4 is a transverse sectional elevation taken substantially in the plane as indicated by the line 4—4 of Figure 3;

Figure 5 is a fragmentary elevation of a further modified form of connection showing the end of a tubular member in its initial formed stage;

Figure 6 is a fragmentary elevation of the tubular member illustrated in Figure 5 after the end thereof, shown formed in Figure 5, has been further shaped;

Figure 7 is a fragmentary sectional elevation of the tubular member illustrated in Figures 5 and 6 showing it after it has been completed and attached to another tubular member.

Referring to the fixed joint illustrated in Figure 1, the tubular member 10 which may be of suitable material, either finished or unfinished, is adapted to be punched or drilled as at 12 for the reception of one end 14 of the tubular member 16. The tubular member 16 is also of any suitable material and may be unfinished or finished, and the end 14 is either spun to spherical shape or swedged, or otherwise formed.

If the tubular member 10 is apertured as at 18 the members 10 and 16, if metallic, are connected as by arc welding as at 20. If the member 10 is not apertured as at 18 the members are connected by spot welding, and the welding 22 may or may not be provided between members 10 and 16.

In Figure 2 the member 24 is apertured as at 26 for reception of the end 28 of the tubular member 30. In this case the member 24 is apertured as at 32 for the reception of the shaped end 28 which is so shaped, as substantially pointed, as to extend within the aperture 32, whereupon the members may be welded as at 34, and if desired, an additional weld as at 36 may be provided. The types of joints illustrated in Figures 1 and 2 may be termed permanent connections.

In Figures 3 and 4 the tubular member 38 is apertured as at 40 for reception of the end 42 and the tubular member 44. The end 42 is spun or otherwise deformed to correspond to the radius of the tube 38 as at 46 to prevent turning of the tube 44 when in assembled position, the spun end 42 being formed with a re-entrant flange 48 which is tapped to receive the relatively small securing bolt 50 which extends through the punched or drilled hole 52 into the tubular member 38. It is, of course, understood that any other form of securing means may be provided, for example the re-entrant flange 48 may not be tapped, and a blind rivet may be inserted through aperture 52 and the aperture formed by the re-entrant flange, and thereafter set to form securing means. It is, of course, understood that welding may be applied if desired between tubular members 44 and 38 as at 54 though this is usually not necessary or desirable where a demountable joint is to be provided.

In the tubular member (spreader) illustrated in Figures 5 and 6, said member 56 has one end spun, rolled, swedged or otherwise formed to provide the neck 58 terminating in the outwardly directed flange 60. Thereafter the flange 60 is further formed, as by means of a die, to provide the outwardly curved portions 62 corresponding to the radius of the tubular member 64 (Figure 7). The neck 58 is then tapped as at 66 for the reception of the securing bolt, or other means 68, passing through the hole 70 provided in the tubular member 64, the hole, as shown, being countersunk. The tubular member 56 in being assembled with the tubular member 64, is inserted through the hole 72 and the bolt 68 applied, and if desired, welding may be applied at 74. Further, in place of the bolt, a permanent fastening means such as a rivet may be used, in which case it is not necessary to form the threads 66.

It is understood that the tubular members may be of any material, i. e. metallic, plastic, etc., and it is understood that this application is not to be limited by the exact embodiments of the invention shown, which are merely by way of illustration and not limitation as various and other forms of the invention will, of course, be apparent to those skilled in the art without departing from the spirit of the invention or the scope of the claims.

I claim:

1. In combination, a metallic tubular member having an aperture therein, another metallic tubular member having an end extending through said aperture and so disposed that the axis of the second tubular member is at an angle to the axis of the first named tubular member, the end of the second tubular member within the first named tubular member being curved and provided with a threaded re-entrant flange, the curved end conforming substantially to the inner wall of the first named tubular member which is contacted by said end, and securing means extending through said first named tubular member and engaging the threads of the re-entrant flange.

2. A tubular structure comprising two cylindrical metal tubes of different diameters, the larger tube having a circular opening in one side thereof to receive and support the end portion of the smaller tube, the smaller tube having a comparatively small boss projecting axially from its end and integrally connected by a web to the surrounding wall of the tube, the boss having a central screw-threaded hole therein and the larger tube having a small opening therethrough in alignment with the said hole, and a screw extending through the small opening and into the said hole.

3. A tubular structure comprising two cylindrical metal tubes of different diameters, the larger tube having a circular opening in one side thereof to receive and support the end portion of the smaller tube, the smaller tube having a reduced axial extension joined by an integral web to the surrounding wall of the tube to provide a point of fastening to the opposite wall of the larger tube, and means for joining said tubes at said point of fastening.

4. A tubular structure comprising two cylindrical metal tubes of different diameters, the larger tube having a circular opening in one side thereof to receive and support the end portion of the smaller tube, the smaller tube having a re-entrant flange extending inwardly of the end thereof providing a hole therein and the larger tube having an opening therethrough in alignment with said hole, and securing means for said tubes extending through said opening and into said hole.

5. A tubular structure comprising two cylindrical metal tubes of different diameters, the larger tube having a circular opening in one side thereof to receive and support the end portion of the smaller tube, the smaller tube being provided with a re-entrant flange extending inwardly of the end thereof having a central screw-threaded hole therein and the larger tube having an opening therethrough in alignment with said hole, and a screw extending through said opening and into said hole.

6. A tubular structure comprising two cylindrical metal tubes of different diameters, the larger tube having a circular opening in one side thereof to receive and support the end portion of the smaller tube, the smaller tube having a comparatively small boss projecting axially from its end and integrally connected by a web to the surrounding wall of the tube, the boss having a centrally disposed hole therein and the larger tube having an opening therethrough in alignment with said hole, and securing means for said tubes extending through said opening and into said hole.

7. A tubular structure comprising two cylindrical metal tubes of different diameters, the larger tube having a circular opening in one side thereof to receive and support the end portion of the smaller tube, the smaller tube having a comparatively small boss projecting axially from its end and integrally connected by a web to the surrounding wall of the tube and the larger tube having a small opening therethrough into which said boss extends, and a weld joint between said boss and larger tube for connecting said tubes together.

ROYAL D. MALM.

REFERENCES CITED

The following references are of record in the file of this patent:

UNITED STATES PATENTS

| Number | Name | Date |
|---|---|---|
| 1,460,928 | Tilden | July 3, 1923 |
| 1,693,680 | Thum | Dec. 4, 1928 |
| 1,918,607 | Lindh | July 18, 1933 |
| 1,992,710 | Matthaei | Feb. 26, 1935 |
| 2,005,205 | Rix | June 18, 1935 |
| 2,009,963 | Matthaei | July 30, 1935 |
| 2,166,941 | Corbin, Jr. | July 25, 1939 |
| 2,179,089 | Hauf | Nov. 7, 1939 |
| 2,194,349 | Almdale | Mar. 19, 1940 |
| 2,433,630 | Sherman | Dec. 30, 1947 |